United States Patent [19]
Ng

[11] Patent Number: 5,368,280
[45] Date of Patent: Nov. 29, 1994

[54] TIRE LIFTING DEVICE

[75] Inventor: Bill Ng, Toronto, Canada

[73] Assignee: Multimatic Inc., Markham, Canada

[21] Appl. No.: 995,933

[22] Filed: Dec. 23, 1992

Related U.S. Application Data

[63] Continuation of Ser. No. 577,115, Sep. 4, 1990, abandoned.

[51] Int. Cl.⁵ .................. B66D 5/32; B66D 1/00; B62D 43/00
[52] U.S. Cl. .................. 254/376; 254/323; 414/463
[58] Field of Search ....... 254/271, 323, 376, DIG. 14; 242/117; 414/463

[56] References Cited

U.S. PATENT DOCUMENTS

| | | | |
|---|---|---|---|
| 2,019,512 | 11/1935 | Stahl | 254/271 X |
| 2,053,976 | 9/1936 | Stahl | 242/117 |
| 2,386,086 | 10/1945 | Beebe | 254/376 X |
| 2,586,048 | 2/1952 | Hyatt | 254/161 |
| 3,494,595 | 2/1970 | Bohan | 242/117 |
| 4,059,197 | 11/1977 | Iida | 254/323 X |
| 4,235,420 | 11/1980 | Ross et al. | 242/117 X |
| 4,625,947 | 12/1986 | Denman et al. | 254/323 |
| 4,997,164 | 3/1991 | Kito et al. | 254/323 |

Primary Examiner—Daniel P. Stodola
Assistant Examiner—Michael R. Mansen

[57] ABSTRACT

A take-up reel suitable for taking up cable as a coil. The reel includes a pair of plates and a central raised hub carrying an outer peripheral surface about which a cable may be wound. The central hub may be formed from one of the plates and may also carry a recess in the hub. An anchor secures one end of the cable between the plates and presents an abutment and locking surface. A cable follower is pivotally biased to engage the outer surface of the coil of cable being taken-up and let out from the take-up reel. The cable follower is adapted to abut an abutment when the cable has been substantially let out (played out) to preclude further rotation of the take-up reel.

A torque limiter may be provided employing a spring plate and parallel oriented clutch plate in face to face abutting relation with the spring plate.

The connection between the take-up reel and torque limiter is effected by a special pin construction to ensure maximum torque transfer to the reel from the torque limiter.

14 Claims, 13 Drawing Sheets

TIRE LIFTING DEVICE

This is a continuation of application Ser. No. 07/577,115 filed Sep. 4, 1990, now abandoned.

FIELD OF INVENTION

This invention relates to new and improved components suitable for use in carrier-lifting devices and finds particular application in vehicle spare tire carrier-lifting devices.

BACKGROUND OF THE INVENTION

Spare tire carrier-lifters have been known for sometime. Early proposals are shown in U.S. Pat. Nos. 2,661,130; 3,734,323; 3,542,413; 3,554,397; 3,865,264; and 3,874,536.

Recently, spare tire carrier-lifting devices have aggregated a number of known elements. Generally this aggregation united a take-up reel for taking up the cable secured to the spare tire for raising and lowering the spare tire relative to the carrier, a speed reducing device for transferring maximum torque from drive means (for example, a manual drive or electric motor) and a torque limiting device to protect the overall structure when excess force is applied. Recent proposals are shown in U.S. Pat. Nos. 4,544,136; 4,535,973 and 4,625,947.

U.S. Pat. No. 4,544,136 purports to disclose in one configuration, apparatus for use in providing a tire lift/carrier comprising a plurality of plates secured together in a side-by-side face abutted relation to form the body of a spool, said spool having a passage for receiving therethrough a shaft on which said spool may be mounted in use, outermost of said plates having identical apertures forming parts of said passage the size of which is complementary to the cross section of the shaft to be applied in said passage, plates adjacent and immediately inward of the outermost of said plates having identical apertures forming parts of said passage the cross section of which is larger than that defined by the apertures in said outermost of said plates and the central of said plates being formed with an inner edge the circumferential extent of which is less than 360 and bounds said passage in part and is interrupted by a substantially radial opening which extends to and through a recessed track defined in said spool at the outer periphery of said central of said plates and thin plate means defining an internal gear having a press fit connection to and forming an extension of one end of said spool. The said patent also discloses torque limiters in FIG. 8 and 11 carrying depressions or recesses in the periphery of a plate to be rotated and cam elements for normally being carried in depressions or radial recesses for the transfer of torque and being forced radially out of the recesses when the torque cannot be transferred.

U.S. Pat. No. 4,535,973 purports to disclose a tire carrier winch for mounting to the underside of a vehicle for raising and lowering a spare tire between storage and access positions comprising, in combination, a housing, a driveshaft rotatably mounted upon said housing, a sheave rotatably mounted within said housing upon said driveshaft, a strand wound upon said sheave, an opening defined in said housing in substantial radial alignment with said sheave, said strand extending through said opening, a drive member connected to said shaft driving connected to said sheave upon rotation of said shaft, a drive member locking member within said housing shiftable between a lock position preventing rotation of said drive member and a drive member release position, and activating means connected to said locking member located adjacent said housing opening and engaging said strand adjacent said opening, said activating means shifting said locking member from said drive member release position to said lock position upon said strand being fully unwound from said sheave. The drive member is a spring finger drive plate carrying a plurality of spring fingers extending from the periphery and drive plate. Each spring finger deforms downwardly out of the plane of the spring finger drive plate for normally sitting in a notch in the drive plate. The reception of the six spring fingers 46 into the six notches 48 produces a frictional driving connection between the plate 40 and drive plate 44, but upon the torque transfer between these components exceeding the frictional interconnection, the spring fingers will ride out of the notches causing relative rotation between the plates producing a torque limiting connection between the driveshaft 22 and the sheave 25.

U.S. Pat. No. 4,625,947 purports to disclose in one configuration, apparatus including a clutch for use in connecting a drive shaft to a device mounted thereon for rotation relative thereto which is used to lift or maintain a load not in excess of a predetermined limit, for example, a tire lift/carrier, comprising a clutch plate connected to the shaft for rotation therewith, a further plate mounted to and for rotation on said shaft in an immediately following relation to said clutch plate, said further plate having the shape of a cup comprising a base portion and generally perpendicular thereto a shallow wall portion, said clutch plate being nested in said cup and having springs engaged thereto in a generally circular arrangement thereof, a plurality of said springs each having a portion thereof projecting outwardly of the outer peripheral boundary of said clutch plate and formed on a uniform radius and to include a further projection centered between its ends which has the shape of a tit, said projecting portions being in a substantially coplannar relation, said shallow wall portion presenting to the interior of said cup at each of a number of locations which are circularly spaced a wall formation arranged to receive and lodge one of said tits, each said tit being normally lodged and laterally contained in one of said wall formations to provide a normally positive and secure drive of said further plate and the device to which it is connected, on rotation of said shaft, absent said device being subjected to a load in excess of said predetermined limited.

It is therefore an object of this invention to provide improved components suitable for use in carrier-lifting devices.

Further and other objects of the invention will be realized by those skilled in the art from the following summary of the invention and detailed description of embodiments thereof.

SUMMARY OF THE INVENTION

According to one aspect of the invention a take-up reel is provided suitable for use in a carrier-lifting device (for example a spare tire carrier-lifting device), the take-up reel for example for taking up cable or line as a coil and comprising a pair of plates, a central hub presenting an outer peripheral surface about which a cable may be wound, the central hub carrying a recess in the hub, means securing one end of the cable between the plates (in one embodiment said means being located within the recess and in another embodiment said means being located proximate the outer radial extent of the recess in the hub, and outer peripheral surface of the hub and preferably presenting an abutment and locking surface), abutment means, a cable follower pivotally biased to engage the outer surface of the coil of cable being taken-up and let out from the take-up reel, the cable follower being adapted to abut the abutment means when the cable has been substantially let out (played out) to preclude further rotation of the take-up reel (in one embodiment the abutment means comprising a surface defining one side edge of the recess in the hub and in another embodiment the abutment means being carried on the means securing the cable between the plates which is located proximate the opening of the recess and being the abutment and locking surface).

According to another aspect of the invention, the take-up reel may comprise a pair of spaced plates, one of the plates having an inside surface and carrying at least a portion of a hub about which a cable may be taken up (preferably the hub being stamped from, and being integral with, the plate), the other plate carrying a recess (preferably integrally stamped from the plate) of the same cross-sectional configuration and size as the hub to receive a portion of the hub remote from the inside surface of the plate yet spacing the plates (preferably the end of the hub remote from the inside surface of the plate having a gently curved circular peripheral edge to fit into a recess whose edge portions are gently curved) without providing corners in the structure between the plates into which the cable being wound about the hub may enter to become pinched, jammed or locked therein, inhibiting the effective action and use of the take-up reel.

In one embodiment, the take-up reel comprises a pair of spaced parallel plates, one plate carrying an integrally formed (stamped) raised cylindrical hub comprising a cylindrically rounded circular peripheral edge remote from plate and the second plate carrying a recess of substantially the same inner diameter as the circular peripheral edge, the recess defined by a circular wall extending away from the plane of the plate in a direction away from the other plate, the circular wall of the recess having a depth less than the distance from the circular peripheral edge of the cylindrical hub to the plate to which the hub is secured, the end of the wall defining the recess remote from the plate in which the recess is disposed being rounded to mate with the rounded circular peripheral edge of the hub.

A carrier-lifting device (for example a tire carrier-lifting device) may be provided comprising a take-up reel as previously described together with means to rotate the take-up reel, torque limiter means to preclude the rotation of the take-up reel when greater than a predetermined torque is applied to the carrier-lifting device, and a speed reducer to reduce the speed of rotation of the take-up reel.

According to another aspect of the invention, the speed reducer may comprise a pair of rotatable eccentrically mounted superimposed gears or plates carrying radially extending equally spaced curved alternating projections and recesses emanating from the periphery thereof, the eccentric mounting of each of the gears being offset relative to the other gear and a ring gear (of greater diameter than the gears) carrying complementary shaped recesses and projections on the inner radial side thereof (the number of recesses in the ring gear being greater, for example by one projection and one recess, than the number of projections and recesses on each gear) the gears each carrying a plurality of apertures therethrough arranged in a circle on each gear with at least portions of apertures of one gear being aligned with portions of apertures of the other gear for the passage of pins therethrough (the pins being of smaller diameter that the apertures through the gears) whereby the pins carried by the two gears are secured to the take-up reel for the circular rotation of the take-up reel by the gears rotating (for example cycloidally) within the ring gear.

According to another aspect of the invention, the speed reducer may comprise a ring gear (having a predetermined number of teeth and recesses circumferentially equally spaced on the inner wall of the ring gear), the ring gear having a center, a pair of eccentrically mounted rotatable planetary gears, each gear having teeth and recesses (one less tooth and recess than the ring gear), and a central circular opening, mounting means having a central opening therethrough, the mounting means carrying two opposed offset circular portions one of the same outer radius as the one aperture of one of the gears and the other of the same outer radius as the aperture through the other gear, the gears, when mounted on the mounting means and carried in the ring gear, engage teeth and recesses on diametrically opposed areas of the ring gear, thereby minimizing twisting of the ring gear when the speed reducer is used.

According to another aspect of the invention, the pivotally biased cable follower comprises an arm pivotally secured at one end angularly spaced from the for example cable or line and the other end of the arm for engaging the radially outer periphery of the wound cable or line.

Because it is desired that a tire carried by a tire carrier incorporating the reel not fall without intentional and controlled unwinding of the take-up reel, the gears of the speed reducer may have an inherent mechanical advantage, for example of 11:1. providing a substantial resistance to the tire falling unless the reel is intentionally rotated. In such reel, the reel may have the following dimensions and the gears the following dimensions:

Reel—Hub—I.D. 50 mm

Plates of Reel—92 mm

Planetary Gears—Outer Diameter—33-34 mm

Inner Diameter—29-30 mm with radiused projections 6-7 mm

Ring Gear I.D.—38 mm

In prior art structures, a spring is provided on the housing to prevent unwanted rotation of the take-up reel.

To assist the winding of the cable or other material about the hub, an elongated curved rib (preferably shallow curved rib) may be provided spaced from the hub to permit the first winding of the cable or other material to pass between the outer peripheral surface of the hub and rib and not interfere with further windings (windings 2 and more) wrapping around the first winding. Thus the rib is shallow and may take on, in profile, the space between the first and second cable windings.

The cable follower is preferably biased (e.g. spring biased) to self-lock against the abutment means when the cable is played out. While the cam follower (without spring biasing) may have no moment on it when the cable is played out when it engages the abutment means, a self-locking cam follower is preferable. Thus where the cam follower is self locking and rotates about, a pin on which it is spring biased, the reactive force of the abutment is taken along the cam follower through the pin creating a moment about the pin (for example proportional to a fraction of the input force) rotating the cam follower, or causing the cam follower to rotate, into the abutment means.

The torque limiter preferably comprises a spring plate having an abutting face and parallel coaxial clutch plate having an abutting face surface for normally engaging the abutting face of the spring plate, the plates carrying indentations (or depressions) and gaps for receiving the indentations (or depressions) when the torque limiter transfers torque from the spring plate to the clutch plate, the indentations extending towards the gaps and riding in the gaps when torque is transferred from the spring plate to the clutch plate and for riding out from the gaps when the torque cannot be transferred to the clutch plate (as for example when a take-up reel has fully let out the cable holding the tire). Preferably, the abutting faces of the spring plate and clutch plate are always touching when torque is being transferred so that maximum torque is transferred. When the torque cannot be transferred, the indentations (depressions) flex against the wall of the gap riding up onto the surface of the other plate, spacing the plates in the areas proximate the indentations (depressions).

Because it is important to maintain the plates in intimate face to face contact when torque is to be transferred, the assembly of the components together when in use is such as to maintain normal torque transfer abutting face to abutting face contact.

In one embodiment a pin passes through the take-up reel, speed reducer and torque limiter to connect the components together, the pin carrying a portion for carrying the take-up reel and speed reducer and preferably carries a rectangular portion (preferably square portion) for passing through a rectangular (preferably square) opening in the spring plate, the corners of the opening being offset circumferentially relative to the indentations to minimize stress on the spring plate.

BRIEF DESCRIPTION OF THE DRAWINGS

The invention will now be illustrated with reference to the following drawings of embodiments of the invention in which.

DETAILED DESCRIPTION OF PREFERRED EMBODIMENTS OF THE INVENTION

Figure 1:
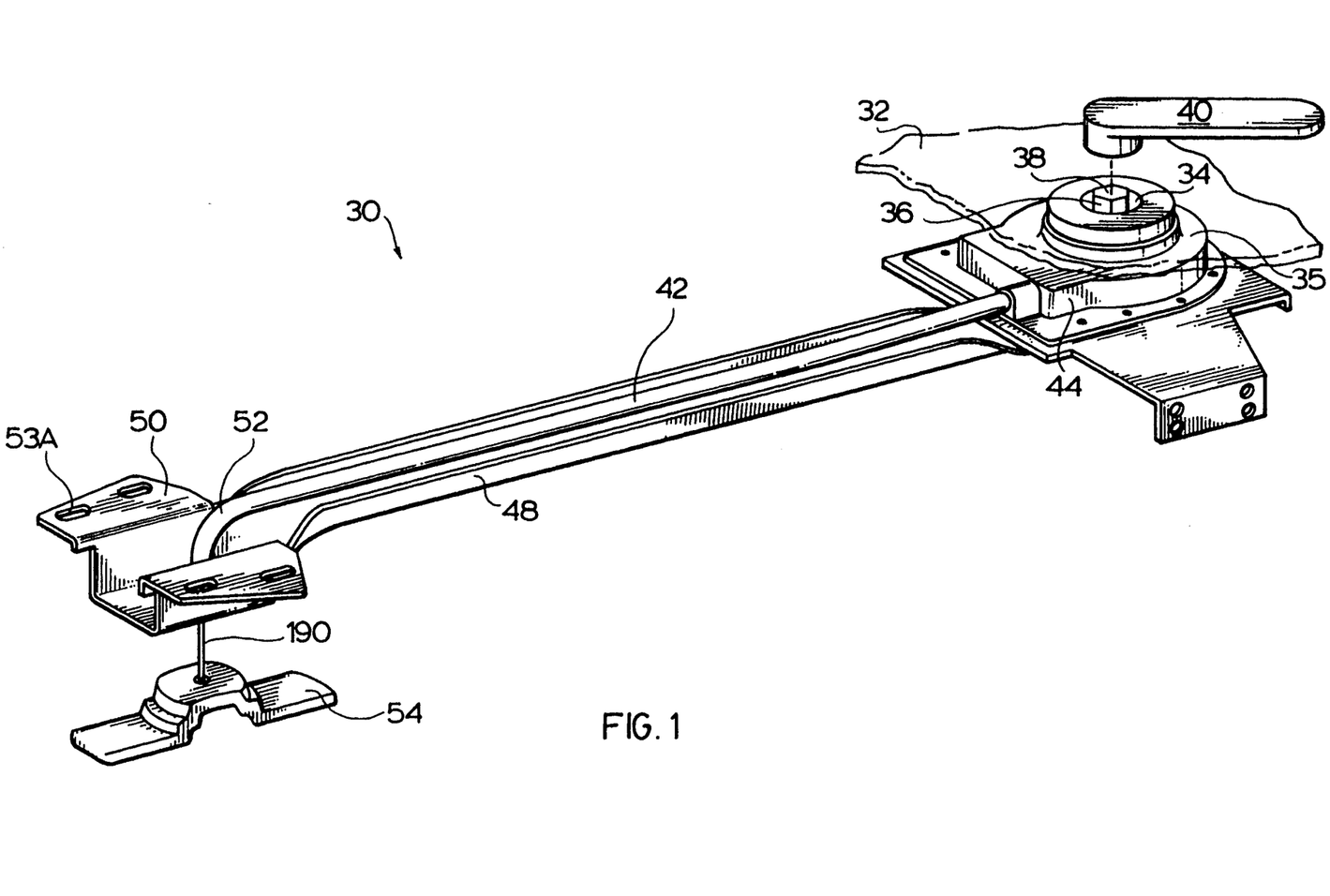
FIG. 1 is a perspective view of a spare tire carrier mechanism incorporating a take-up reel constructed according to an embodiment of the invention.
Figure 2:
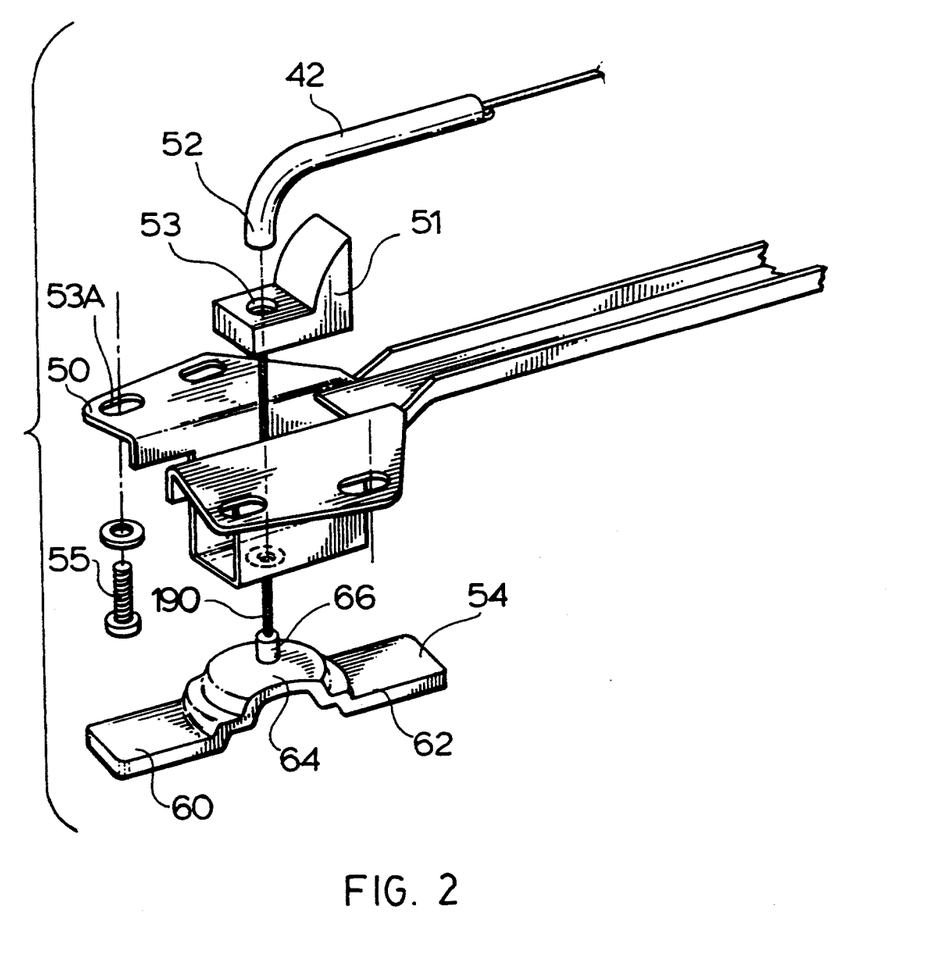
FIG. 2 is a perspective exploded close-up view of part of the structure shown in FIG. 1.
Figure 3:
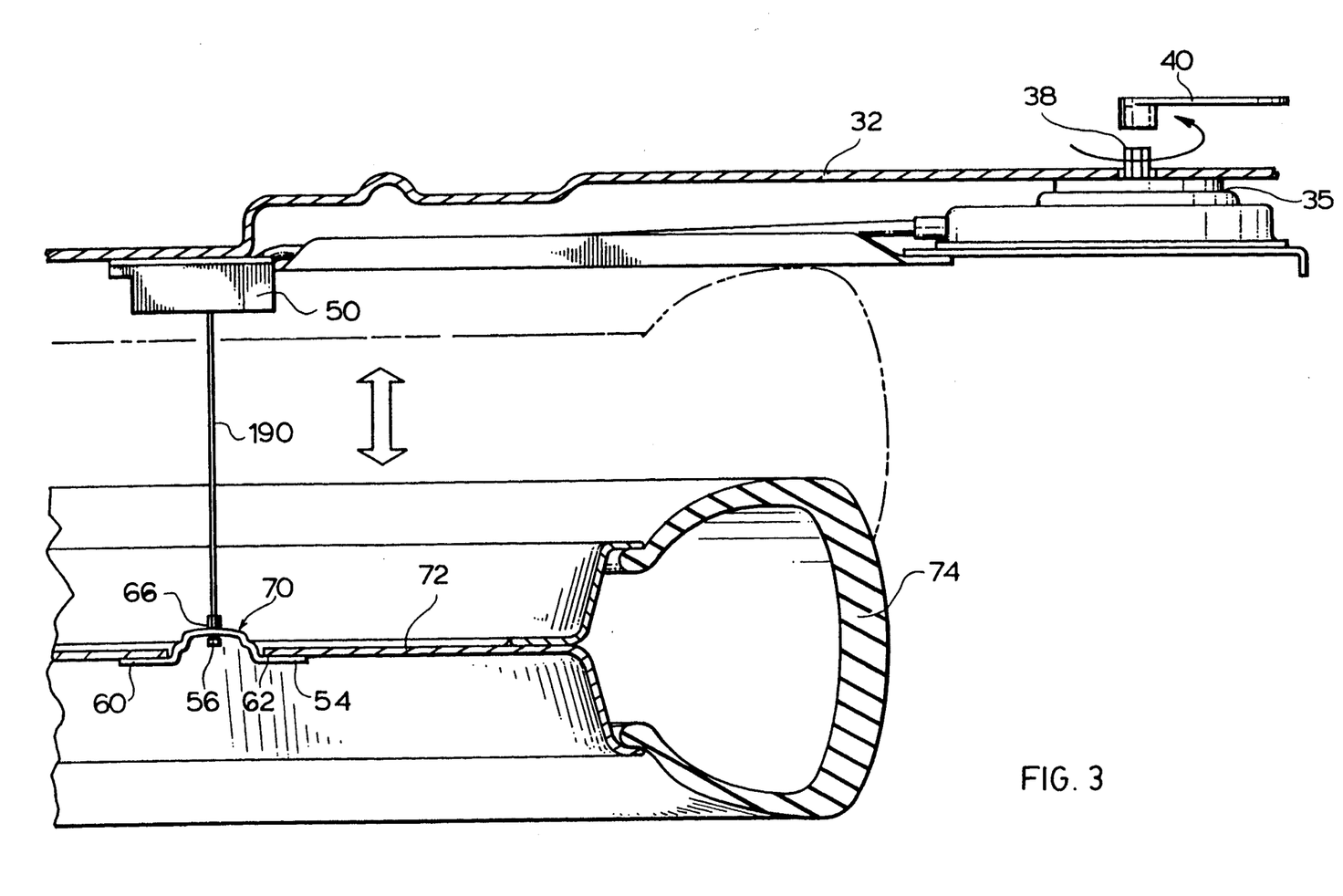
FIG. 3 is a side view of the tire carrier of FIG. 1 in use.

With reference to FIG. 1, there is shown a spare tire carrier mechanism 30 mounted below truck bed 32 of a truck (not entirely shown) situated behind the truck cab (not shown) of the truck with upper housing portion 34 of housing 35 projecting through an aperture 36. Hexagonal bolt head 38 projects upwardly from housing portion 34 and is rotatable by handle 40 to operate the mechanism 30. Hollow tube 42 extends from one side 44 of housing 35 for carrying the cable 190 taken up and played out by mechanism 30. Tube 42 is supported by elongated U-shaped support 48 and extends to U-shaped mounting bracket 50 mounted through apertures 53A by screws 55 (see FIG. 2) to the underside of the truck bed 32 to support the end of the tube 42 which bends downwards at 52. FIG. 2 illustrates the manner of connection of bent end 52 of tube 42 to U-shaped bracket 50 through angle block 51. In this regard, the end of bent tube 52 is sonically welded into bore 53 of block 51. With reference to FIG. 2, cable 190 carries tire support 54 at the end thereof supported on metal cap 56 (see FIG. 3) on the end of cable 190. Support 54 carries laterally extending wings 60 and 62 integrally secured to central member 64 carrying hollow boss 66 through which cable 190 extends.

Support 54 is tilted for insertion through central opening 70 of tire rim 72 of tire 74.

Figure 4:
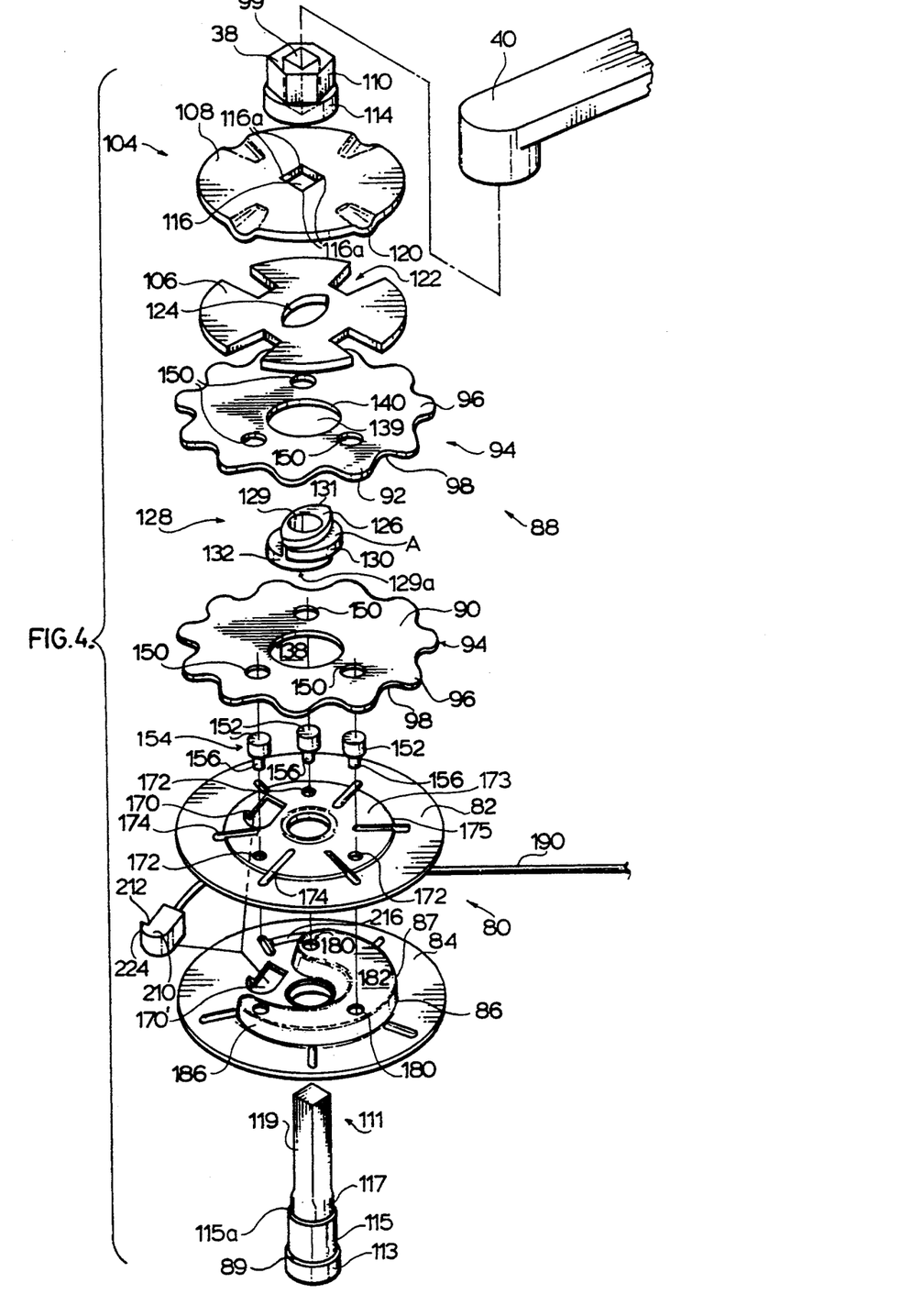
FIG. 4 is a perspective exploded view of components making up the operating mechanism of the tire carrier shown in FIG. 1.
Figure 4A:
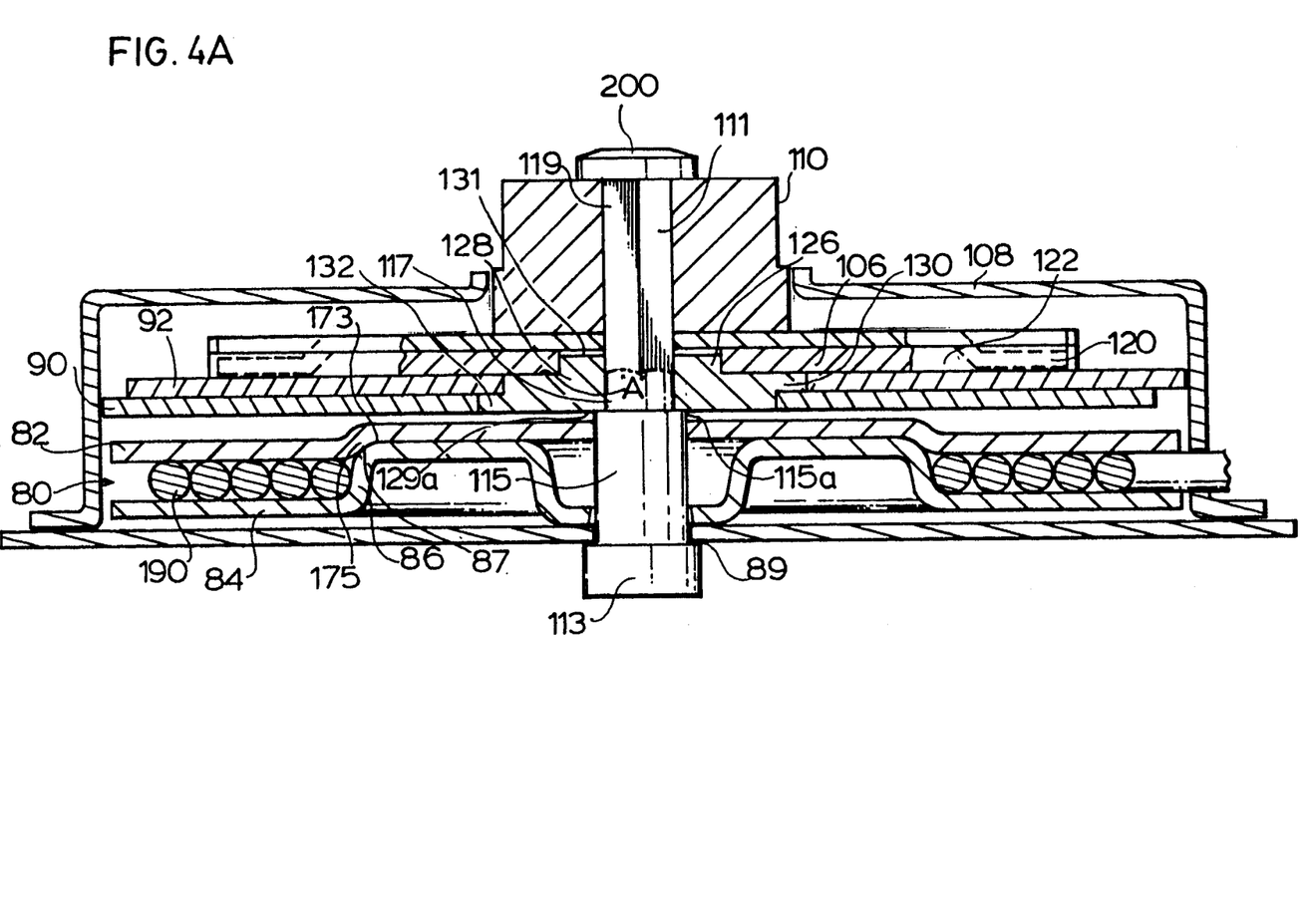
FIG. 4A is a close-up side view in cross-section of the components of FIG. 4 assembled.
Figure 5:
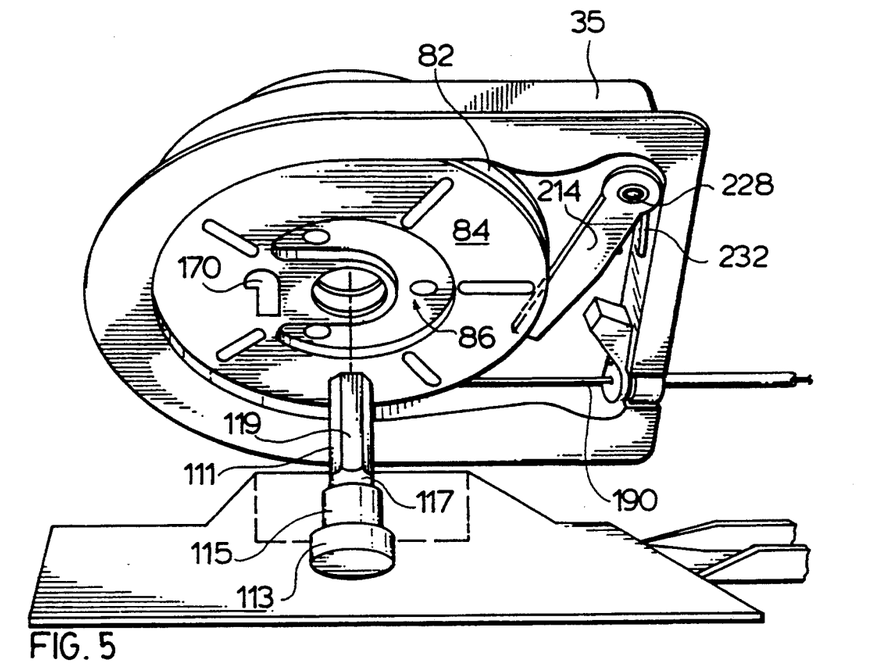
FIG. 5 is a view of the mechanism of FIG. 4 assembled into the housing looking up from below.
Figures 14, 14A:
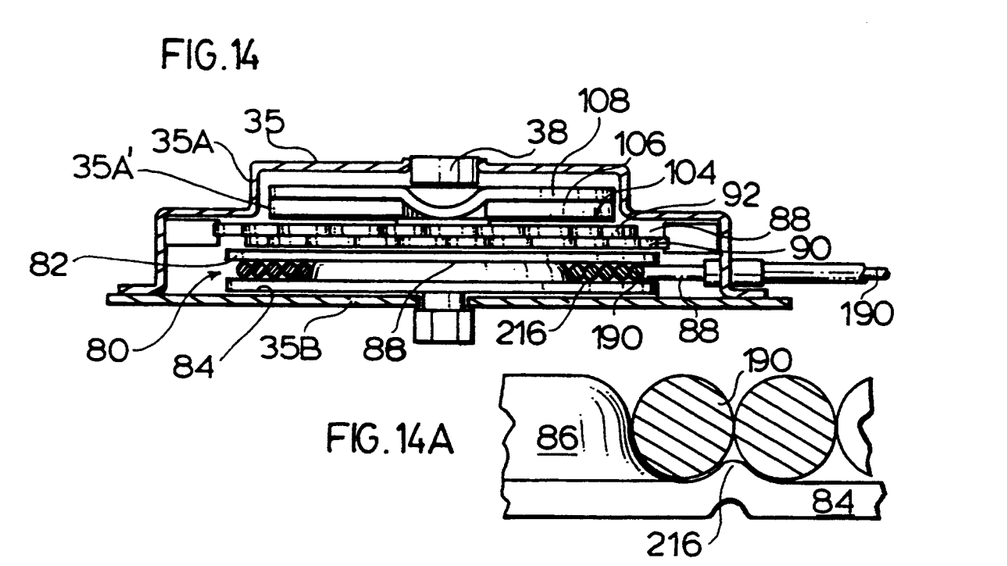
FIG. 14 is a side view in cross-section of the mechanism of FIG. 4 assembled in the housing.
FIG. 14A is a close-up side view of part of the structure shown in FIG. 14.
Figure 15:
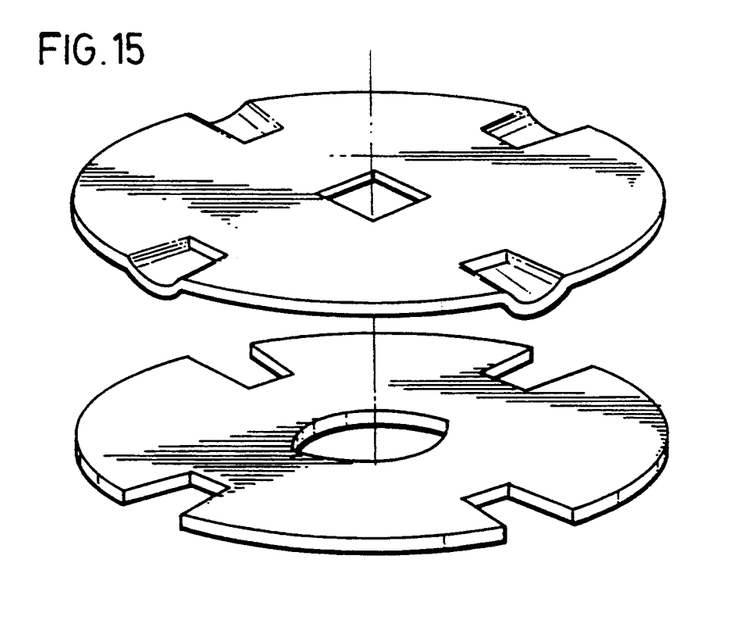
FIG. 15 is a perspective view of two components of the carrier mechanism of FIG. 4.
Figure 16:
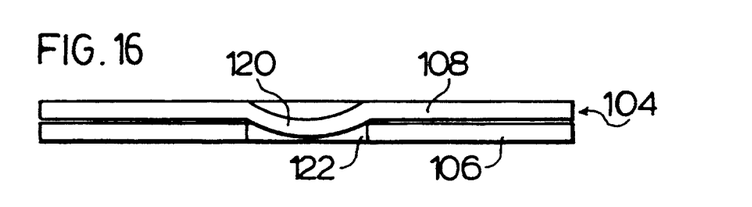
FIGS. 16 and 17 are close-up spare side views of the two components shown in FIG. 15 illustrating the operation of the components.
Figure 17:
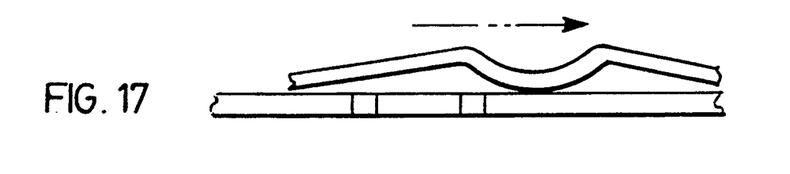

With reference to FIGS. 4, 4A and 14, housing 35 (not shown in FIGS. 4 and 4A) houses:

(a) take-up reel 80 comprising two stamped round plates 82 and 84, plate 84 carrying integrally stamped central hub 86 with rounded peripheral edge 87 around which hub 86 cable 190 is wound and plate 82 carrying recess 173 having rounded gently curved edge 175 (to mate with curved edge 87) when hub 86 is inserted into recess 173;

(b) speed reducer 88 (see also FIG. 11) comprising:
  i) a pair of oppositely mounted gears 90 and 92, each gear having a wavy peripheral surface 94 made up of eleven raised curved teeth or projections 96 and eleven curved recesses 98 and
  ii) and ring gear 109 (see FIG. 11) carrying twelve curved teeth and twelve curved recesses 100 and 102 respectively on the inside of the housing 35 of like shape as teeth 96 and recesses 98 and c) torque limiting device 104 (see FIG. 15, 16 and 17) made up of stamped plates 106 and 108.

Handle 40 operates (rotates) nut 110 having upper hexagonal bolt head 38 and lower round portion 114. Handle 40 has a bore of the same shape and size as head 38 for receiving head 38 for rotation of nut 110. Nut 110 carries square bore 99 therethrough to secure extension 119 of square cross section of pin 111. Portion 114 sits above centrally disposed square opening 116 of plate 108 and rotates with plate 108 (because of extension 119) at the same angular speed as handle 40 rotates nut 110. Plate 108 is stamped with downwardly directed depressions 120 (not radially aligned with corners 116A of square aperture 116 through plate 108) for being received in circumferentially spaced openings 122 in plate 106. Plate 106 carries centrally disposed almond shaped (eye shaped opening) 124. Thus rotation of handle 40, rotates nut 110 and plate 108. Because of depressions 120 extending into openings in plate 106, as plate 108 rotates, plate 106 rotates. If plate 106 is unable to rotate, depressions 120 of plate 108 are forced out of openings 122 as plate 108 continues to rotate. As plate 108 continues to rotate, depressions 120 continually fall into openings 122 when vertically aligned therewith and are forced out of openings 122 when not aligned. (See FIGS. 15, 16 and 17).

Almond shaped opening 124 receives almond shaped connecting portion 126 of case hardened connector 128 made from powdered metal. Connector 128 also comprises two eccentrically mounted offset circular portions 130 and 132. These circular portions are carried in circular openings 138 and 139 of gears 90 and 92 respectively in intimate contact with the circular side wall 140 surrounding each opening, thus filling the openings 138 and 139. Thus gears 90 and 92 rotate eccentrically as connector 128 is rotated by plate 106 and are opposed to one another.

When pin 111 is connected to nut 110, extension 119 of pin 111 passes through bore 129 through connector 128, through opening 116 into square bore 99 of nut 110. When pin 111 is passed into hexagonal head 38, portion 117 lies within opening 129.

Each round eccentrically mounted portion 130 and 132 passes into openings 139 and 138 of gear plates 92 and 90 and position the gears with respect to connector 128.

Each gear 92 and 90 carries round apertures 150 equally radially spaced about centrally disposed openings 139 and 138.

Three apertures 150 carry three round heads 152 of three pins 154 which heads 152 have a lesser diameter than apertures 150. Pins 154 carry stems 156. Each round head 152 passes through one aperture 150 of plate 90 and one aperture 150 of plate 92. (See FIG. 11).

Gears 92 and 90 rotate eccentrically as connector 128 is rotated by the rotation of plate 106. As is apparent from FIGS. 4 and 11, gears 90 and 92 when mounted in housing 35, each engage ring gear 109 at diametrically opposed sides thereof and are offset to one another with portions of apertures 150 of gear 90 aligned with portions of apertures 150 of gear 92.

Figure 11:
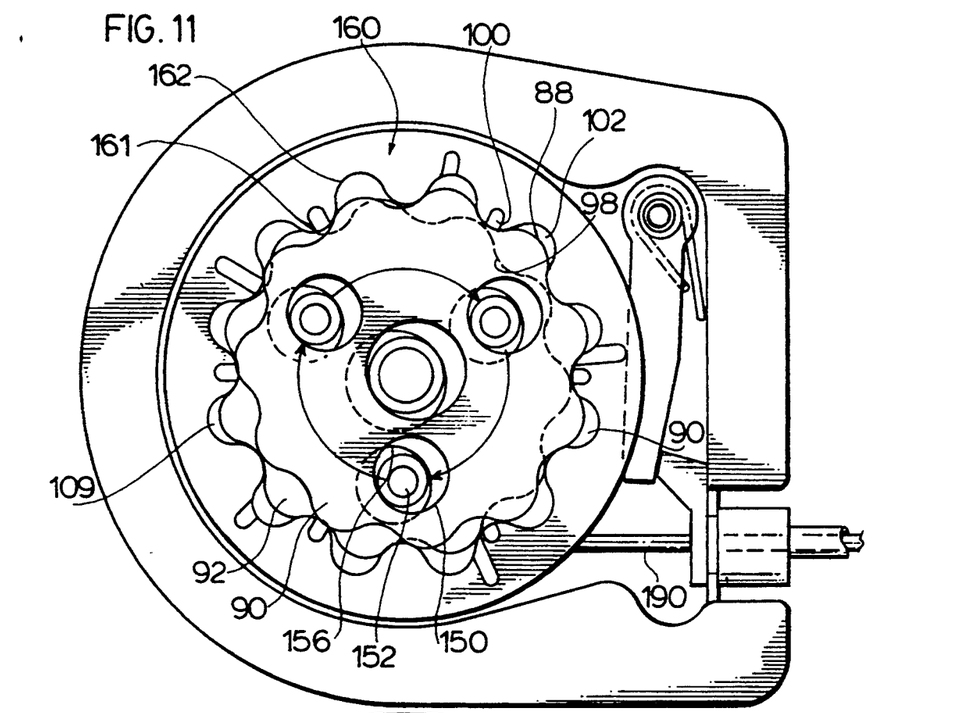
FIGS. 11 and 11A illustrate the operation of other components of the mechanism.
Figure 11A:
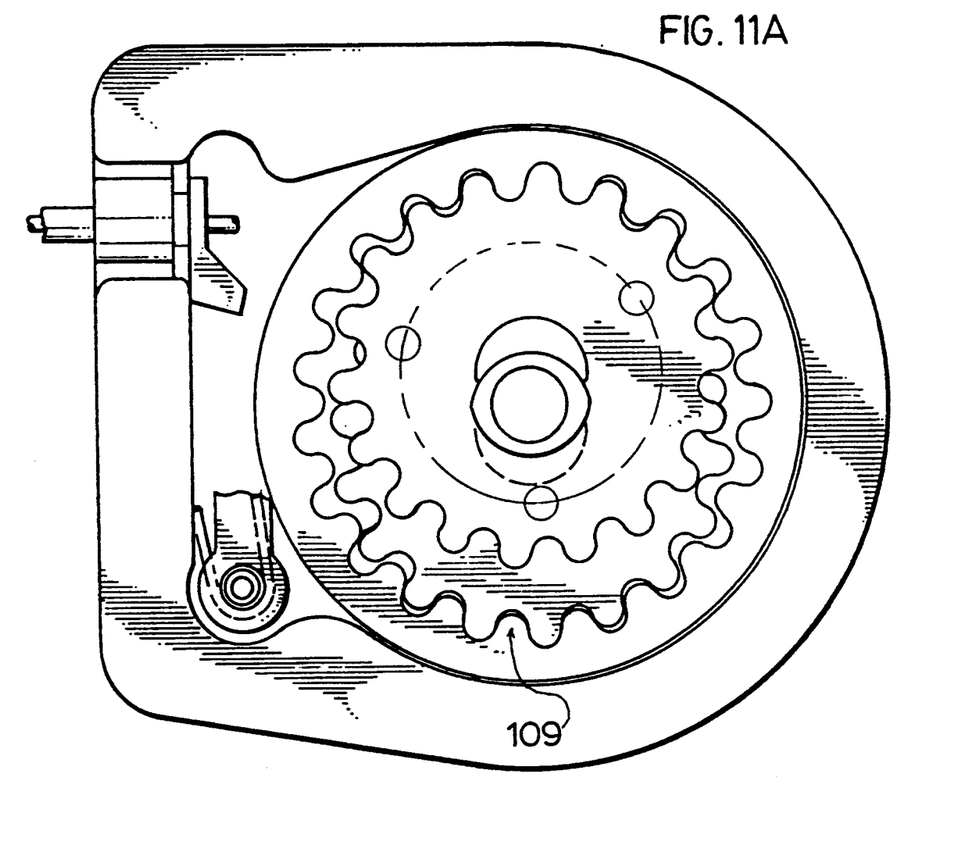
Figure 12:
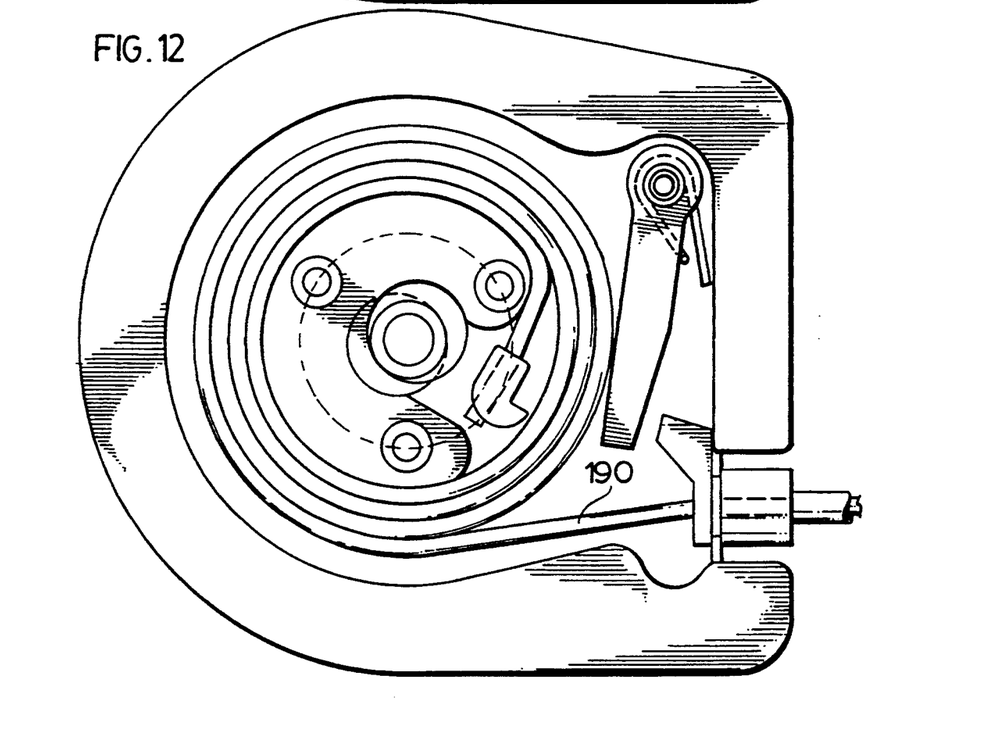
FIG. 12 (found with FIG. 11) illustrates the further operation and position of the operating components shown in FIGS. 5 and 6.

Housing 35 carries on its inside surface, ring gear 109 (See FIGS. 11 and 11A) carrying twelve wavy radially inwardly extending projections 161 and twelve radially outwardly extending 162 recesses (one more projection and one more recess than each of gears 90 and 92) for being engaged by the recesses 98 and projections 96 respectively (See FIGS. 11 and 11A). Thus as gears 92 and 90 are rotated by connector 126, they are caused to rotate with the circular portions 130 and 132 respectively, about the center connector 128. As the eccentrically mounted gears 92 and 90 are rotated by the rotation of circular portions 132 and 130, the projections 96 and recesses 98 of each gear mesh with the recesses 162 and projections 161 and gears 90 and 92 are caused to be wobbled about portions 130 and 132 of connector 128 at a lesser rotational speed than handle 40 (clockwise if the connector is rotated counter-clockwise and vice versa). As the gears wobble within ring gear 109 (with each engaging opposite sides) they cause each pin head 152 to be rotated in a circle (See FIGS. 11 and 11A) thus rotating stems 156 in a circle in the same direction as the gears.

Stems 156 are mounted through apertures 172 in plate 82 and apertures 180 of integrally drawn or stamped hub wall 182 of hub 86 of plate 84. Plate 82 carries circular recess 173 having curved peripheral edge wall 175 and carrying L-shaped cut out portion 170. Plate 82 also carries radially extending reinforcing ribs 174. Plate 84 also carries an L-shaped cut out portion 170' (of the same size and shape as cut out 170) aligned with cut out portion 170. Hub 86 carries peripheral surface 186 (and curved edge portion 87) about which the cable 190 (See FIGS. 4, 5, 6, 10, 11 and 12) can be wound. Cable 190 carries on one end L-shaped anchor portion 210, of the same shape as L-shaped portions 170 and 170' into which portion 210 is inserted and locked in. Anchor 210 when locked between the plates 82 and 84 carries an abutment "stop" surface 212 against which spring biased pivotal arm 214 (see FIG. 6) on housing 35 locks when all of the cable 190 (except for a small coiled portion 217 (see FIG. 6) engaging peripheral surface 186 of coil hub 86) has been played out. In this regard the end 220 of arm 214 carries a ninety degree angular corner 222 to fit into and engage the ninety degree corner formed by abutment "stop" surface 212 and side 224 of anchor 210.

Arm 214 is pivotally spring biased about pin 228 attached to housing 35 by torsion spring 226 to urge arm 214 to rotate about pin 228 by the stored forces in spring 226 towards anchor 210. Thus as the reel 80 is rotated to take up cable 190, the end of arm 214 is pivoted away from anchor 210 by the coil of cable 190, winding torsion spring 226 by arm 230 of spring 226 being urged to rotate away from hub 86 thereby winding spring 226 against arm 232 abutting housing wall 35'.

Figure 6:
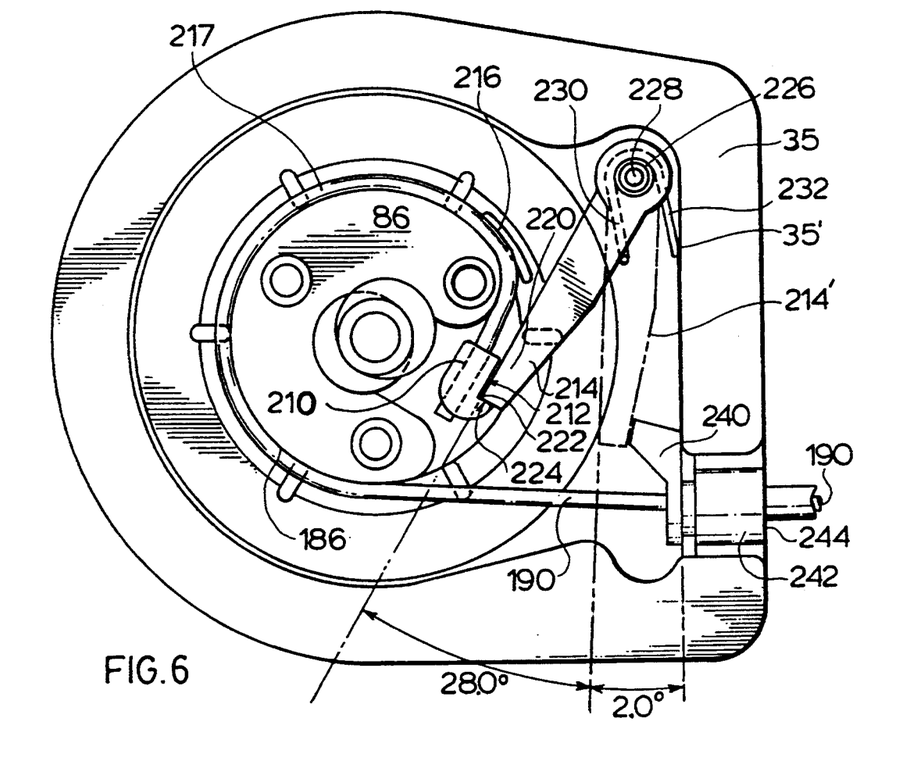
FIG. 6 is a plan view of the assembled mechanism of FIG. 5 illustrating the operation and position of one of the components.

With reference to FIG. 6, arm 214 is shown in bold line when cable 190 has been played out (as when the tire is fully lowered) and in dotted line at 214' when cable 190 is fully wound about hub 86 (as when the tire is fully raised). At the cable fully wound position, arm 214 engages integral plastic arm 240 (see FIG. 6) of plastic fitting 242, secured to housing 35 carrying bore 244 through which cable 190 passes. As can be seen, arm 214 rotates through 28 degrees from its locking position with anchor 210 to its position abutting arm 240.

For compactness and to save space, housing may be constructed so that only 2 degrees of space is provided between wall 35' and the position of arm 240 against which arm 214 abuts. (See FIG. 6).

Figure 7:
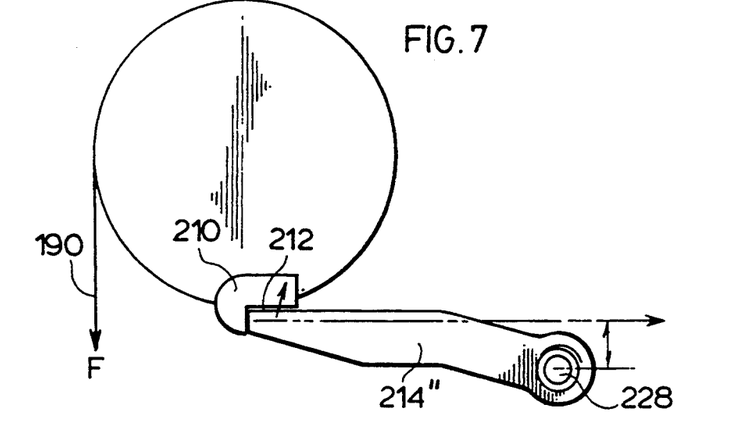
FIGS. 7, 8 and 9 illustrate schematically positions of different ones of components whose use is illustrated in FIG. 6.

Arm 214 is mounted so that it is self-locking. In this regard and with reference to FIGS. 7, 8 and 9, three possible mountings are shown. FIG. 7 illustrates a self-locking condition of an arm 214" for engaging the cable 190 being wound on the reel 80. In this regard when a Force "F" is exerted on cable 190 and with arm 214" engaging anchor 210 most of the forces precluding any further playing out of cable 190, is taken along arm 214" so that arm 214" is rotated about pin 228 into anchor 210 (clockwise) towards surface 212 (without considering the biasing by a spring like 226 of arm 214" towards anchor 210).

Figure 8:
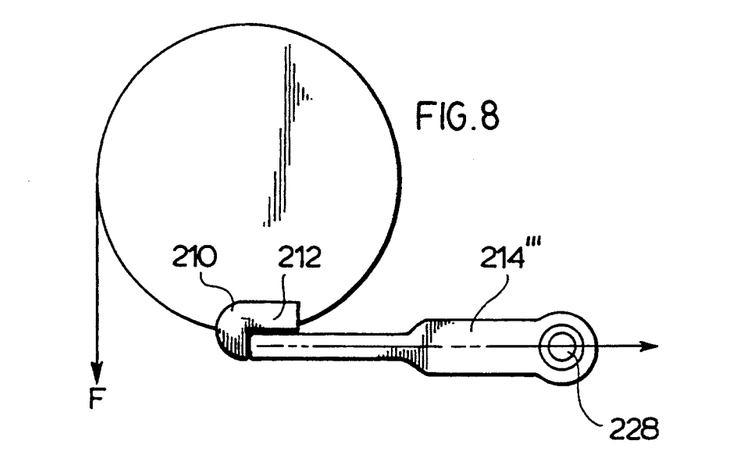

FIG. 8 illustrates a "no" moment condition of arm 214'". When Force "F" is exerted on cable 190 and with arm 214'" engaging anchor 210, the force along arm 214'" do not cause 214'" to rotate towards surface 212, there being a balancing of the forces so that no moment is created to rotate arm 214" about pin 228 (once again without considering the biasing by a spring like 226).

Figure 9:
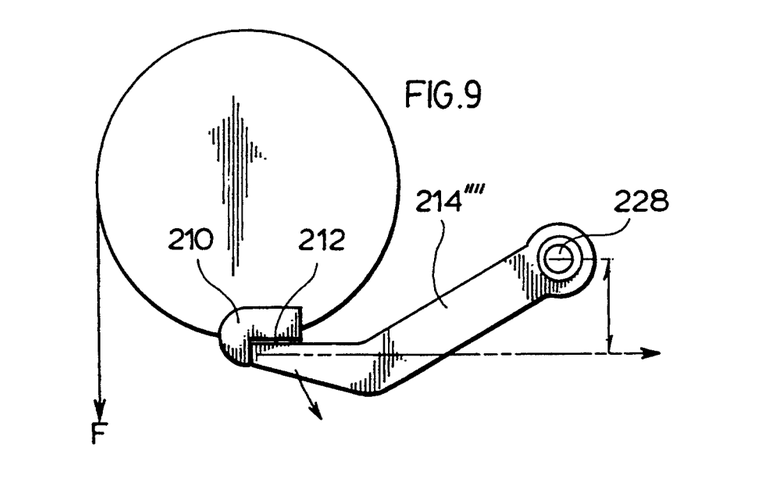

FIG. 9 illustrates a "slip" condition of arm 214'" (without considering the biasing of a spring like spring 226 of arm 214""). When force "F" is exerted on cable 190, and with arm 214"" engaging anchor 210, the forces along arm 214"" do not cause arm 214"" to rotate towards surface 212. Rather arm 214"" is caused to rotate away from surface 212 about pin 228 (which must be overcome by the forces exerted by a torsion spring like 226 to cause arm 214"" to rotate into surface 212). Thus when arm 214"" is used, a torsion spring 226 which exerts a greater force (a force to overcome the slip condition and to rotate arm 214"" into surface 212) is required than the spring needed to be used with either arm 214" or arm 214.

Figure 10:
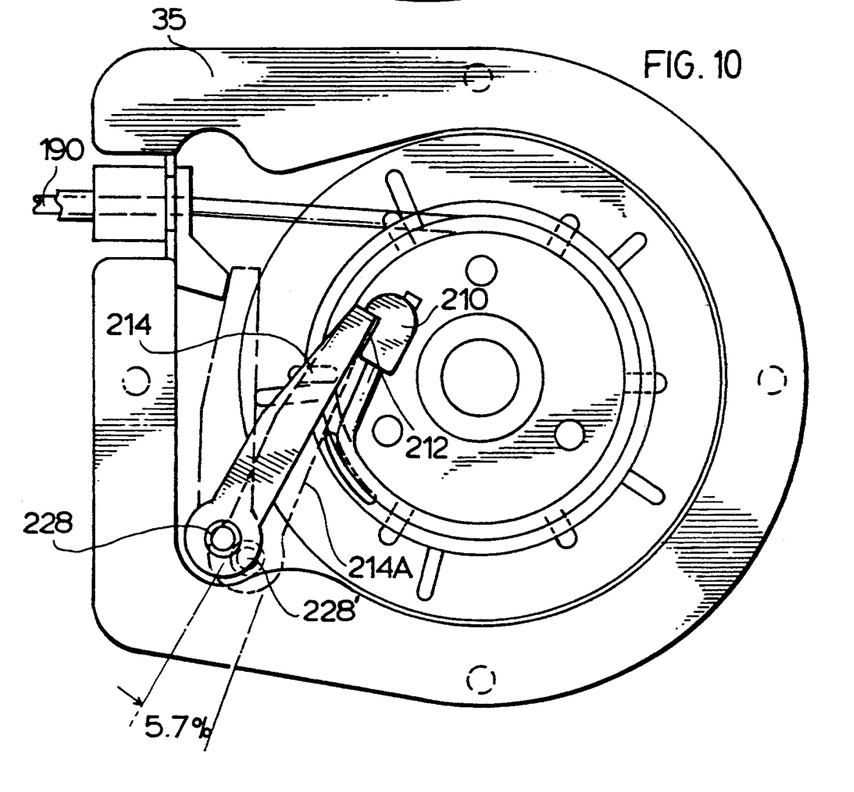
FIG. 10 is a plan view of the assembled mechanism of FIG. 5 illustrating different positions of the one component whose operation is illustrated in FIG. 6.

With reference to FIG. 10, alternate positioning of arm 214 in housing 35 is shown. Arm 214 secured to rotate about pin 228 is self-locking. Arm 214A secured to rotate about pin 228' would be mounted for slipping (which must be overcome by a torsion spring exerting greater forces). As can be seen, the angular displacement between the mounting of the two arms is 5.7°.

FIG. 14 illustrates tire carrier lifting device 30 assembled in housing 35 made up of stamped cover portion 35A and base 35B. Cover portion 35A carries recessed portion 35A' for receiving the components of the tire carrier 30. As can be seen, take up reel 80 is juxtaposed to speed reducer 88 which is juxtaposed to torque limiter 104. A better and more detailed view of the assembly of the components in the housing is shown in FIG. 4A.

Pin 111 carrying portions 113, 115, 117 and 111 has been inserted through the components shown in FIG. 4 for assembly of the components shown in FIG. 4A with (a) plate 84 of reel 80 sitting on the edge surface 89 of circular portion 113;

(b) portion 115 passing through spaced plates 82 and 84;

(c) the bottom 129a of connector 128 sitting on edge peripheral surface and pin portion 117 extending into bore 129 of connector 128;

(d) plate 92 sitting on surface "A" of connector 128;

(e) clutch plate opening 124 surrounding almond portion 126 with clutch plate 106 sitting higher than the top surface 131 (See FIG. 4A) for ensuring normal face to face abutment between plate 106 and plate 108;

(f) square portion 119 of pin 111 passing through part of connector 128 and square opening 116 in spring plate 108;

(g) portion 119 passing through nut 110; and (h) the upper portion or square portion 119 of pin 111 passing through nut 110 being deformed at 200 to secure and maintain the components together between end portion 113 and deformed portion 200 of pin 111.

Figure 18:
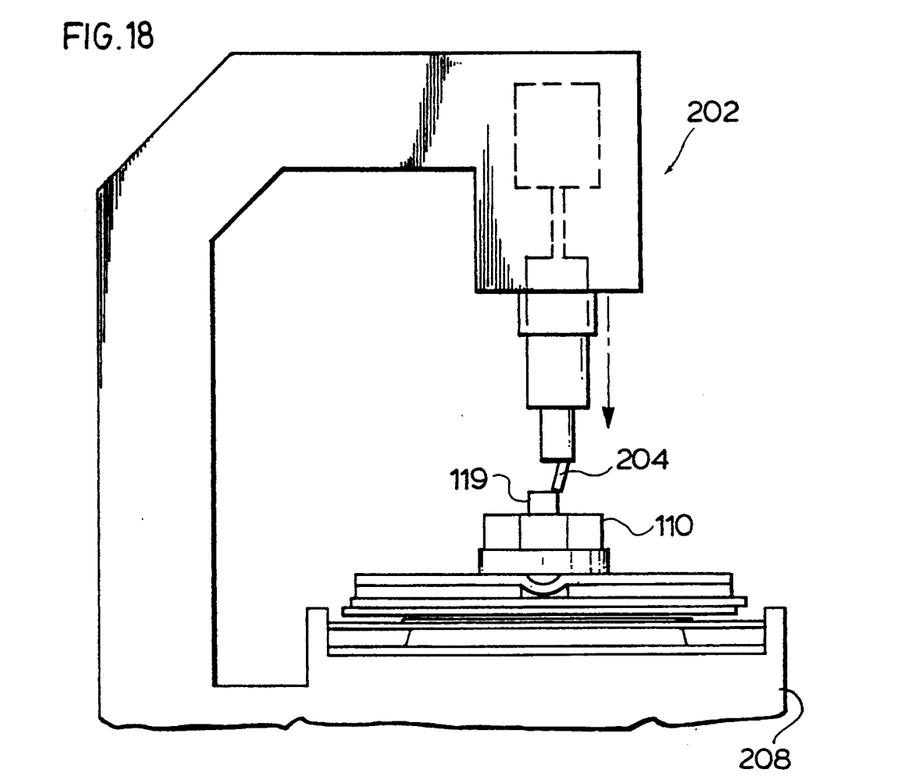
FIG. 18 is a schematic view of an apparatus used to secure components together shown in FIG. 4.
Figure 19:
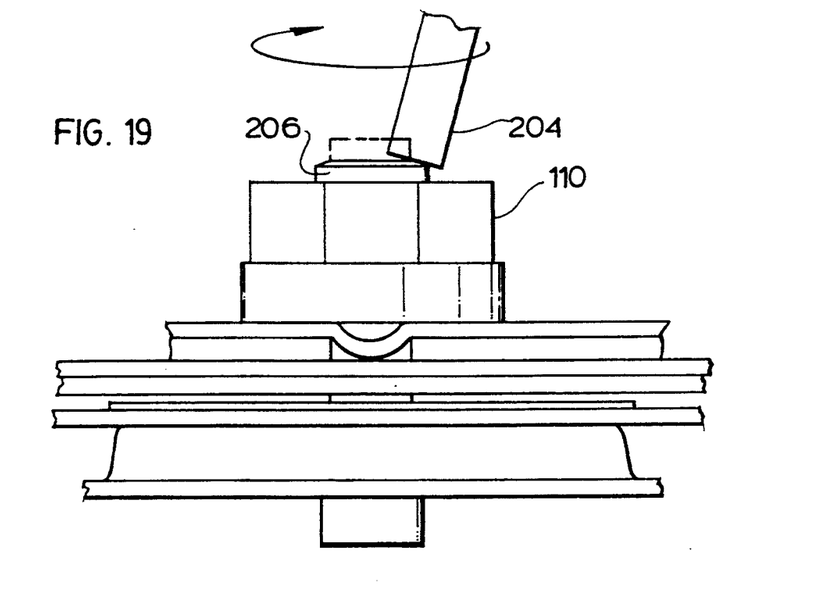
FIG. 19 is a side view partly in cross-section of part of the apparatus shown in FIG. 18 used to secure components together.

Portion 200 is deformed in the manner shown in FIGS. 18 and 19.

Batec Radial Riveter 202 Model RN330 made by Baltec Maschinenbau AG (CH-8330 Pfaffikan Zurich, Switzerland) shown schematically in FIGS. 18 and 19 is used to swage the end of pin 111 by the application of an angular lateral force applied at the peripheral edges of pin 111 by head 204 as it is rotated, flattening the material 206 and pushing it radially outwardly to lock nut 110 on pin 111 as the remainder of the assembly is held in place on base 208.

To assist the winding of cable 190 around surface 186 of take up reel 80, elongated curved rib 216 (whose shape in profile is the space between two coils of cable) is provided to permit the first winding of the cable to pass between surface 86 and rib 216.

Figure 13:
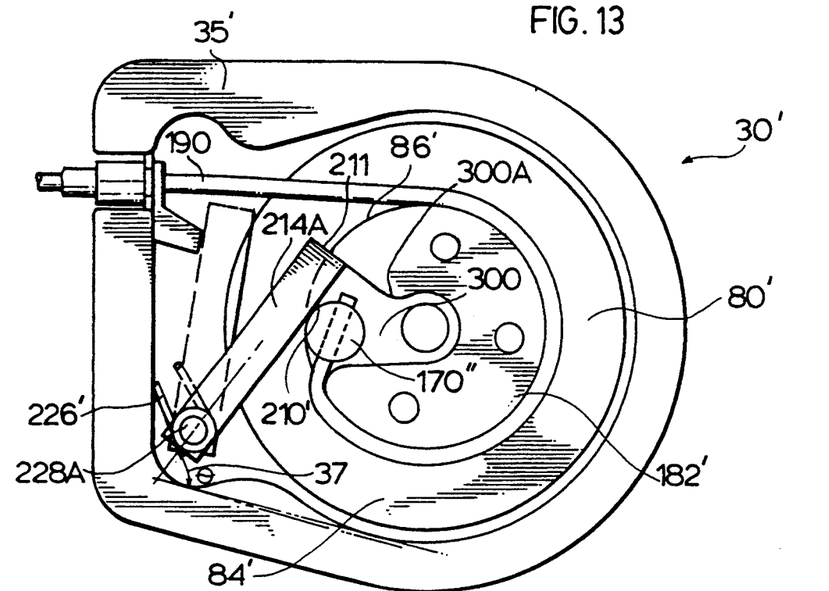
FIG. 13 (found with FIG. 10) is a plan view of take-up a reel of another mechanism according to another embodiment of the invention.

With reference to FIG. 13, tire carrier lifting device 30' is shown mounted in housing 35' comprising reel 80', anchor 210 with abutment "stop" surface 212 being replaced by cylindrical shaped anchor 210' (anchored in round apertures 170" in spaced plates (one of which is shown at 84')). Anchor 210' is positioned in recess 300 in raised hub 182' (spaced from plate 84') radially inwardly of the outer peripheral surface 86' about which cable 190 is wound. Arm 214A is spring biased by spring 226' about pin 228A towards hub 182'. Recess 300 is defined on one side proximate its entrance by radially extending "stop" side wall 300A for engaging the end edge 211 of arm 214A which side wall 300A extends in the same radial direction when end edge 211 engages side wall 300A. In this regard as cable 190 is played out until the last coil remains, as arm 214A passes over anchor 210" into recess 300, it abuts side wall 300A stopping rotation of take-up reel 80'. For best operation arm 214A is mounted to be "self-locking". The angle of arm 214A from pin 228A relative to housing wall 37 is about 50°. The relative dimensions of the arm 214A, hub 182', opening into recess 300, and length of raised side wall 300A are as follows:

Arm 214A—about 56 mm
Hub 182'—I.D. about 51 mm
Opening into recess 300—about 18 mm
Length of raised side wall 300A—about 16 mm To ensure no back drive and thus, to preclude the tire falling by itself, tire carrier lifting device 30 also includes speed reducer 88 which provides an 11:1 mechanical advantage in the gear system. Thus the unwinding of cable 190 requires substantial applied forces (greater than the weight of the tire carried by the device 30) and thus the lowering of tire 74 can only be accomplished by deliberately and intentionally operating handle 40 to rotate take-up reel 80 to play out cable 190 and thus tire 74. Thus it is apparent that an improved tire carrier lifting device 30 incorporating an improved take-up reel 80 has been provided. By rotating handle 40 at an angular velocity (w), torque limiter is rotated at angular velocity (w). Connector 128 is also rotated at an angular velocity (w). The rotation of connector 128 rotates gears 90 and 92 in ring gear 109 rotating pin heads 152 and thus reel 80 at a lesser angular velocity than angular velocity (w) but with considerable torque being applied for letting out cable 190. When cable 190 has been fully played out so that arm 214 engages anchor 210 and locks between surfaces 212 and 224, reel 88 is precluded from rotating, stopping the rotation of gears 90 and 92, connector 128 and plate 106 of torque limiter 104. Thus when cable 190 has been played out, only plate 108 is rotatable by rotation of handle 40.

Because plate 106 is precluded from rotating, recesses 120 ride in and out of cut out openings 122. Except for the locking of arm 214A tire carrier 30' operates substantially the same.

When cable 190 is fully wound within reel 80, tire 74 is held in a raised position and cannot fall without intentional rotation of handle 40.

As many changes can be made to the embodiments without departing from the scope of the invention, it is intended that all material contained herein be interpreted as illustrative of the invention and not in a limiting sense.

The embodiments of the invention in which an exclusive property or privilege is claimed are as follows:

1. A take-up reel suitable for use in a carrier-lifting device, the take-up reel for taking up cable as a coil and consisting essentially of a pair of plates, one of the pair of plates having an integrally stamped central hub formed from said one of the pair of plates and providing an outer peripheral surface raised laterally away from the plate, about which a cable may be wound when the pair of plates are assembled to provide the take-up reel, the integrally stamped central hub also carrying a recess in the hub, the take-up reel having means securing one end of the cable between the plates adjacent the recess, abutment means located adjacent the recess in the integrally stamped central hub and disposed on the means securing one end of the cable between the plates, a cable follower pivotally biased to engage the outer surface of the coil of cable being taken-up and let out from the take-up reel, the cable follower further being adapted to abut the abutment means when the cable has been substantially let out to preclude further rotation of the take-up reel.

2. The take-up reel of claim 1 wherein said means securing one end of the cable is located within the recess.

3. The take-up reel of claim 1 or 2 wherein the pivotally biased cable follower comprises an arm pivotally secured at one end angularly spaced from the cable and the other end of the arm for engaging the radially outer periphery of the wound cable.

4. The take-up reel of claim 1 or 2 wherein to assist the winding of the cable about the hub, an elongated curved rib is provided spaced from the hub to permit the first winding of the cable to pass between the hub and rib and not interfere with further windings wrapping around the first winding.

5. The take-up reel of claim 1 wherein the abutment means disposed on the means securing one end of the cable between the plates is located proximate the opening of the recess and presents an abutment and locking surface for the cable follower.

6. The take-up reel of claim 5 wherein the pivotally biased cable follower comprises an arm pivotally secured at one end angularly spaced from the cable and the other end of the arm for engaging the radially outer periphery of the wound cable.

7. The take-up reel of claim 5 wherein to assist the winding of the cable about the hub, an elongated curved rib is provided spaced from the hub to permit the first winding of the cable to pass between the hub and rib and not interfere with further windings wrapping around the first winding.

8. A tire carrier-lifting device comprising a take-up reel for taking up cable as a coil and consisting essentially of a pair of plates, one of the pair of plates having an integrally stamped central hub formed from said one of the pair of plates providing an outer peripheral surface raised laterally away from the plate about which a cable may be wound when the pair of plates are assembled to provide the take-up reel, the integrally stamped central hub also carrying a recess in the hub, the take-up reel having means securing one end of the cable between the plates adjacent the recess, abutment means located adjacent the recess in the integrally stamped central hub and disposed on the means securing one end of the cable between the plates, a cable follower pivotally biased to engage the outer surface of the coil of cable being taken-up and let out from the take-up reel, the cable follower further being adapted to abut the abutment means when the cable has been substantially let out to preclude further rotation of the take-up reel.

9. The take-up reel of claim 8 wherein said means securing one end of the cable is located within the recess.

10. The tire carrier lifting device of claim 8 or 9 wherein the pivotally biased cable follower comprises an arm pivotally secured at one end angularly spaced from the cable and the other end of the arm for engaging the radially outer periphery of the wound cable.

11. The tire carrier lifting device of claim 8 or 9 wherein to assist the winding of the cable about the hub, an elongated curved rib is provided spaced from the hub to permit the first winding of the cable to pass between the hub and rib and not interfere with further windings wrapping around the first winding.

12. The take-up reel of claim 8 wherein the abutment means disposed on the means securing one end of the cable between the plates is located proximate the opening of the recess and presents an abutment and locking surface for the cable follower.

13. The tire carrier lifting device of claims 12 wherein the pivotally biased cable follower comprises an arm pivotally secured at one end angularly spaced from the cable and the other end of the arm for engaging the radially outer periphery of the wound cable.

14. The tire carrier lifting device of claim 12 wherein to assist the winding of the cable about the hub, an elongated curved rib is provided spaced from the hub to permit the first winding of the cable to pass between the hub and rib and not interfere with further windings wrapping around the first winding.

* * * * *